United States Patent
Ohira et al.

(10) Patent No.: US 9,543,567 B2
(45) Date of Patent: Jan. 10, 2017

(54) METHOD FOR MANUFACTURING CATHODE ACTIVE MATERIAL FOR LITHIUM SECONDARY BATTERY

(75) Inventors: Naoto Ohira, Nagoya (JP); Ryuta Sugiura, Toyohashi (JP); Shohei Yokoyama, Nagoya (JP); Miho Endo, Nagoya (JP); Koji Kimura, Gifu (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 680 days.

(21) Appl. No.: 13/613,889

(22) Filed: Sep. 13, 2012

(65) Prior Publication Data

US 2013/0071553 A1 Mar. 21, 2013

Related U.S. Application Data

(60) Provisional application No. 61/535,422, filed on Sep. 16, 2011, provisional application No. 61/612,538, (Continued)

(51) Int. Cl.
 *B05D 5/12* (2006.01)
 *H01M 4/04* (2006.01)
 (Continued)

(52) U.S. Cl.
 CPC ......... *H01M 4/0471* (2013.01); *H01M 4/1391* (2013.01); *H01M 10/052* (2013.01); *Y02E 60/122* (2013.01); *Y02P 70/54* (2015.11)

(58) Field of Classification Search
 CPC . H01M 4/0471; H01M 4/0419; H01M 4/1391
 (Continued)

(56) References Cited

U.S. PATENT DOCUMENTS 5,631,100 A 5/1997 Yoshino et al.
6,468,695 B1 * 10/2002 Barker .......................... 429/224
(Continued)

FOREIGN PATENT DOCUMENTS

EP 2 071 650 A1 6/2009
EP 2 202 828 A1 6/2010
(Continued)

OTHER PUBLICATIONS

International Search Report and Written Opinion dated Nov. 6, 2012.

*Primary Examiner* — Michael Wieczorek
(74) *Attorney, Agent, or Firm* — Burr & Brown, PLLC

(57) ABSTRACT

The present invention relates to a method for manufacturing cathode active material for a lithium secondary battery. The manufacturing method according to the present invention is characterized by including: (1) an intermediate generation process, wherein an intermediate which is powder or a shaped object containing the first material compound which is a compound of the transition metal other than lithium, which constitutes said lithium composite oxide, is generated, (2) a lithium source compound addition process, wherein the second material compound which is a lithium compound is added so that the second material compound in the shape of film may adhere to the surface of said intermediate, and (3) a sintering process, wherein lithium composite oxide is generated by sintering said intermediate in the state where said second material compound has adhered to its surface.

9 Claims, 2 Drawing Sheets

Related U.S. Application Data filed on Mar. 19, 2012, provisional application No. 61/650,065, filed on May 22, 2012.

(51) Int. Cl.
*H01M 4/1391* (2010.01)
*H01M 10/052* (2010.01)

(58) Field of Classification Search
USPC .......................... 427/77, 126.1; 429/231.95
See application file for complete search history.

(56) References Cited

U.S. PATENT DOCUMENTS

| | | |
|---|---|---|
| 2008/0268347 A1 | 10/2008 | Ohzuku et al. |
| 2010/0173199 A1* | 7/2010 | Hiraki et al. ................. 429/223 |
| 2010/0209771 A1* | 8/2010 | Shizuka et al. ............... 429/207 |
| 2010/0221613 A1* | 9/2010 | Ueki et al. ............... 429/231.95 |

FOREIGN PATENT DOCUMENTS

| | | |
|---|---|---|
| EP | 2 466 671 A2 | 6/2012 |
| JP | 05-226004 A1 | 9/1993 |
| JP | 2004-253305 A | 9/2004 |
| JP | 2005-336004 A1 | 12/2005 |
| JP | 2006-273620 A | 10/2006 |
| JP | 2006273620 A * | 10/2006 |
| JP | 2008-258160 A1 | 10/2008 |
| JP | 2009-081130 A1 | 4/2009 |
| JP | 2011-105594 A1 | 6/2011 |
| WO | 2010/094394 A1 | 8/2010 |

\* cited by examiner

METHOD FOR MANUFACTURING CATHODE ACTIVE MATERIAL FOR LITHIUM SECONDARY BATTERY

BACKGROUND OF THE INVENTION

1. Field of the Invention

The present invention relates to the method for manufacturing the cathode active material of a lithium secondary battery.

2. Description of Related Art

A lithium secondary battery using lithium composite oxide (lithium transition metal oxide) as an cathode active material is known widely (for example, refer to Japanese Patent Application Laid-open No. H05-226004 etc.).

SUMMARY OF THE INVENTION

In the conventional method for manufacturing this kind of cathode active materials, the synthesis degree of the cathode active material finally obtained was not necessarily good. This is considered to be due to that when mixing and sintering the compound of the transition metal other than lithium, which constitutes a lithium composite oxide, and a lithium compound, unevenness in mixing the both arises and thereby the part where the lithium composite oxide with desired composition is not successfully synthesized. Such unevenness in mixing remarkably arises especially when a shaping step is introduced in a manufacturing process in order to make the cathode active material finally obtained in a desired form (for example, plate, rod, polyhedron, large particle with an average particle diameter of not less than approximately 100 micrometers, etc.). The present invention is conceived in order to address such a subject.

The manufacturing method which is the subject matter of the present invention is a method for manufacturing a cathode active material for a lithium secondary battery, which contains a lithium composite oxide. Herein, typically, a "lithium composite oxide" refers to an oxide denoted by $LixMO_2$ ($0.05<x<1.10$ and M is at least one kind of transition metal).

The manufacturing method according to the present invention is characterized in that the manufacturing method includes the following processes.

An intermediate generation process, wherein the intermediate which is powder or a shaped object containing the first material compound which is a compound of the transition metal other than lithium, which constitutes the above-mentioned lithium composite oxide, is generated.

A lithium source compound addition process, wherein the second material compound which is a lithium compound is added so that the second material compound in the shape of film may adhere to the surface of the above-mentioned intermediate generated by the above-mentioned intermediate generation process.

A sintering process, wherein the above-mentioned lithium composite oxide is generated by sintering the above-mentioned intermediate in the state where the above-mentioned second material compound has adhered to the above-mentioned surface by the above-mentioned lithium source compound addition process.

Herein, the "shape of film" can be defined as the state where the above-mentioned second material compound has continuously adhered to the above-mentioned surface of the above-mentioned intermediate. Specifically, for example, when the particles of the above-mentioned second material compound has adhered to the above-mentioned surface of the above-mentioned intermediate with a thickness of at least one or more particle (preferably two or more particles), it can be said that the above-mentioned second material compound has adhered to the above-mentioned surface of the above-mentioned intermediate in the "shape of film".

The coverage in the above-mentioned surface of the above-mentioned intermediate is preferably not less than 70%, more preferably not less than 90%. Here, "coverage" is the value which shows, in percentage, the rate of the portion that the above-mentioned second material compound has adhered to the above-mentioned surface of the above-mentioned intermediate.

The above-mentioned lithium source compound addition process may be a process wherein liquid containing the second material compound, in which the above-mentioned second material compound is dispersed or dissolved in a solvent, is added to the above-mentioned intermediate. In this case, specifically, the above-mentioned lithium source compound addition process may be, for example, a process wherein liquid containing the above-mentioned second material compound is sprayed on the above-mentioned intermediate and thereby making the above-mentioned second material compound adhere to the above-mentioned surface of the intermediate.

In addition, the above-mentioned intermediate generation process may include a granulation process, wherein the granulated object of the above-mentioned first material compound is formed.

In this case, the above-mentioned granulation process may be a process wherein the above-mentioned granulated object is formed by spray drying the slurry prepared by mixing the powder of the plural above-mentioned first material compounds while wet grinding.

Moreover, the above-mentioned intermediate generation process may include a shaping step wherein forming material containing the above-mentioned first material compound is shaped in a predetermined form.

The above-mentioned shaping step may be a process wherein, for example, the above-mentioned granulated object obtained by the above-mentioned granulation process is shaped.

Moreover, the above-mentioned intermediate generation process may include a calcination process wherein the above-mentioned granulated object is heat-treated.

In this case, the above-mentioned calcination process may be a process wherein the above-mentioned granulated object which passed through the shaping step is heat-treated.

Nickel hydroxide and cobalt hydroxide may be used as the above-mentioned first material compound. Moreover, anhydrous lithium hydroxide may be used as the above-mentioned second material compound.

In addition, the above-mentioned lithium composite oxide which is the subject matter of the manufacturing method according to the present invention typically has layered rock-salt structure. Herein, the "layered rock-salt structure" refers to a crystal structure in which a layer of transition metal other than lithium and a layer of lithium are laminated by turns with a layer of an oxygen atom between them, that is, a crystal structure in which a layer of the ion of transition metal other than lithium and a layer of lithium ion are alternately laminated on both sides of a oxide ion (typically, $\alpha$-$NaFeO_2$ type structure: cubic rock-salt type structure in which transition metal and lithium are regularly arrayed in the direction of [111] axis).

As the above-mentioned lithium composite oxide which has a layered rock-salt structure, lithium cobaltate, lithium nickelate, lithium manganate, lithium nickelate manganate, lithium nickelate cobaltate, lithium cobaltate nickelate manganate, lithium cobaltate manganate, etc. can be used. Furthermore, one or more sorts of elements, such as Mg, Al, Si, Ca, Ti, V, Cr, Fe, Cu, Zn, Ga, Ge, Sr, Y, Zr, Nb, Mo, Ag, Sn, Sb, Te, Ba, and Bi, may be contained in such materials. That is, for example, the above-mentioned lithium composite oxide may be a nickel-cobalt-aluminum system composite oxide.

In the manufacturing method according to the present invention, the above-mentioned intermediate containing the above-mentioned first material compound is generated first. Next, the above-mentioned second material compound is added so that the above-mentioned second material compound which is a lithium compound may adhere to the surface of the generated above-mentioned intermediate uniformly. Then, the above-mentioned lithium composite oxide is generated by sintering the above-mentioned intermediate in the state where the above-mentioned second material compound has adhered to the above-mentioned surface.

Thus, in accordance with the manufacturing method according to the present invention, the occurrence of unevenness in mixing the above-mentioned first material compound and the above-mentioned second material compound which is lithium compounds on sintering is suppressed as much as possible. Therefore, in accordance with the present invention, the above-mentioned cathode active material in the state where the above-mentioned lithium composite oxide with desired composition was successfully synthesized can be obtained.

DETAILED DESCRIPTION OF THE INVENTION

Hereafter, suitable embodiments of the present invention will be explained, using examples and comparative examples. In addition, the statement about the following embodiments has described mere examples of embodiments of the present invention once considered to be best at the time of application as specifically as possible, in order to satisfy the description requirements (descriptive requirement and enabling requirement, etc.) for the specification demanded by law.

Therefore, as will be mentioned later, naturally, the present invention is not limited to the specific configuration of the embodiments and examples to be described later. Since an understanding of the consistent description of embodiments will be disturbed if the exemplification of various kinds of changes (modifications) which may be given to the embodiments or examples is inserted into the explanation of the embodiments, these modifications are collectively described herein at the end to a maximum possible extent.

1. SCHEMATIC CONFIGURATION OF LITHIUM SECONDARY BATTERY

Figure 1:
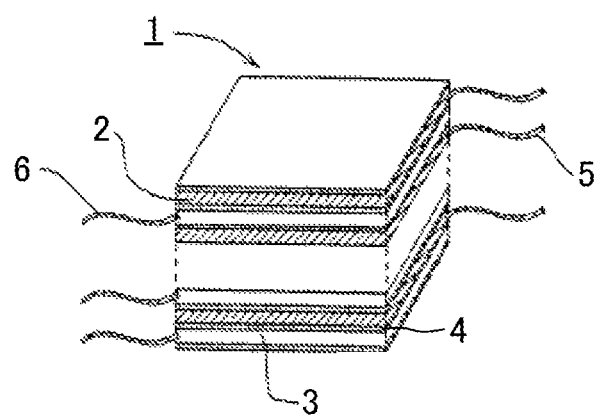
FIG. 1 is a sectional view showing an example of the schematic structure of a lithium secondary battery.

FIG. 1 is a sectional view showing an example of the schematic structure of a lithium secondary battery 1. Referring to FIG. 1, this lithium secondary battery 1 is what is called a liquid type, and is equipped with the cathode plate 2, the anode plate 3, the separator 4, the tab 5 for cathode, and the tab 6 for anode.

The separator 4 is disposed between the cathode plate 2 and the anode plate 3. That is, the cathode plate 2, the separator 4, and the anode plate 3 are laminated in this order. The tab 5 for cathode is electrically connected to the cathode plate 2. Similarly, the tab 6 for anode is electrically connected to the anode plate 3.

The lithium secondary battery 1 shown in FIG. 1 is constituted by liquid-tightly encapsulating the laminated object of the cathode plate 2, the separator 4, and the anode plate 3, and electrolysis solution which contains a lithium compound as electrolytes in a predetermined battery case (not shown).

2. CONFIGURATION OF CATHODE

Figure 2:
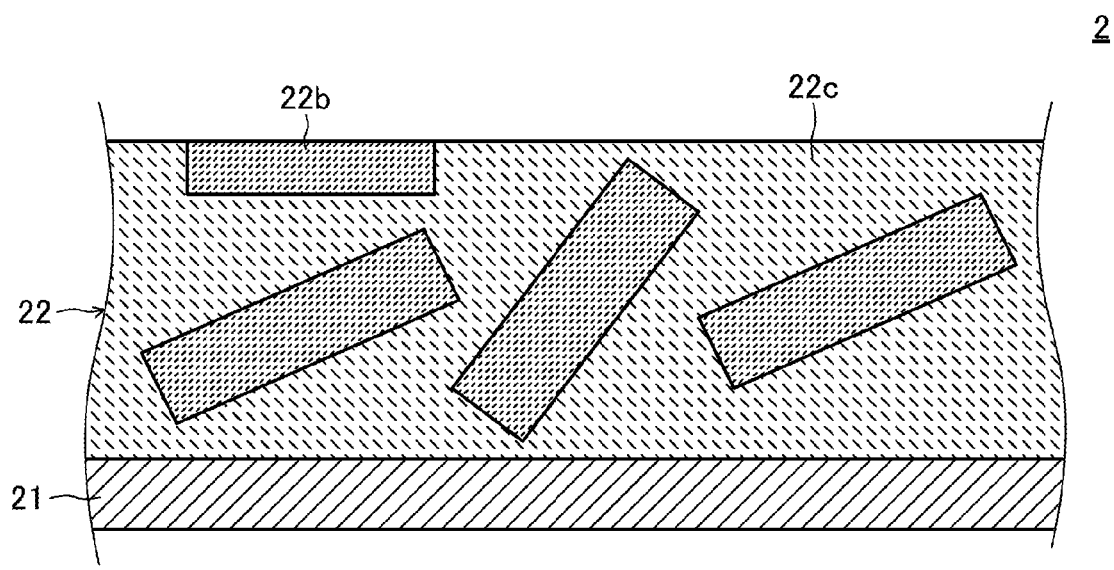
FIG. 2 is an expanded sectional view of the example of the cathode plate shown in FIG. 1.

FIG. 2 is an expanded sectional view of an example of the cathode plate 2 shown in FIG. 1. Referring to FIG. 2, the cathode plate 2 is equipped with the cathode charge collector 21 and the cathode active material layer 22. That is, the cathode plate 2 is formed in the state where the cathode charge collector 21 and the cathode active material layer 22 are joined (laminated) mutually.

The cathode active material layer 22 is constituted by the cathode active material particles 22b and the binding material 22c which contains an electric conduction auxiliary agent while supporting this cathode active material particle 22b in a dispersed state. The cathode active material particles 22b manufactured by the manufacturing method according to the present invention are lithium composite oxide which has layered rock-salt structure, for example, may be formed as tabular particles by passing through a predetermined shaping step in a manufacturing process.

3. OUTLINE OF MANUFACTURING METHOD

Hereafter, the outline of the method for manufacturing the cathode active material particles 22b shown in FIG. 2 will be explained.

(A) Intermediate Generation Process

The intermediate which is the powder or shaped object containing plural kinds of first material compounds is generated. Here, the "first material compound" is a compound of the transition metals other than lithium which constitutes a lithium composite oxide. For example, when a lithium composite oxide has composition of $Li(Ni_x, Co_y, Al_z)O_2$ (x+y+z=1), as the above-mentioned first material compounds, a nickel compound, a cobalt compound, and an aluminum compound are used.

In addition, in this intermediate generation process, the granulation process, wherein the granulated object of the first material compounds is formed, may be performed. As this granulation process, a process, wherein the slurry prepared by mixing the powder of plural kinds of first material compounds while wet grinding is spray dried, may be performed.

Moreover, in this intermediate generation process, the shaping step, wherein the forming material containing the first material compounds is shaped in a predetermined form, may be performed. This shaping step may be, for example, a process wherein the above-mentioned granulated objects are shaped.

Furthermore, in this intermediate generation process, the calcination process, wherein the above-mentioned granulated objects are heat-treated, may be performed. This calcination process may be a process wherein the granulated object which passed through the shaping step is heat-treated.

It may be suitably chosen whether the granulation process should be performed or not, whether the shaping step should be performed or not, and whether the calcination process should be performed or not, in accordance with the characteristics (shape, the quality of the material, etc.) of the cathode active material particles 22b or the cathode active material layer 22 which should be obtained.

The "intermediate" generated by the intermediate generation process includes the granulated object of the first material compounds, the shaped object (including the shaped object of the above-mentioned granulated objects) of the first material compounds, and the cathode active material precursor (composite oxide of transition metals other than lithium) obtained by the calcination process wherein the above-mentioned granulated object (including the shaped object of such granulated objects) is heat-treated.

(B) Lithium Source Compound Addition Process

The second material compound (lithium source compound) is added so that the second material compound which is a lithium compound may adhere to the surface of the intermediate uniformly. As the addition method of the second material compound, any methods (spraying, hybridization, dipping, etc.) may be employed in accordance with the character (shape etc.) of the intermediate. Specifically, for example, a method, wherein the surface of an intermediate is coated with the second material compound by atomizing through a spray the dispersion or solution (hereafter, referred to as "lithium compound containing liquid") of the particulates obtained by grinding the above-mentioned lithium compound in a predetermined solvent, may be suitably employed.

As the second material compound, lithium hydroxide monohydrate ($LiOH-H_2O$), lithium carbonate ($Li_2CO_3$), anhydrous lithium hydroxide (LiOH), etc. may be used. Here, when non-hydrates, such as lithium carbonate and anhydrous lithium hydroxide, are used as the second material compound, the volume change due to anhydration on synthesis is suppressed. Therefore, in this case, the occurrence of crack on synthesis is suppressed as much as possible.

However, when lithium carbonate is used as the second material compound, the synthesis degree tends to become comparatively low since the reactivity of lithium carbonate is not high. Therefore, as the second material compound, it is suitable to use anhydrous lithium hydroxide.

(C) Sintering Process

By sintering the intermediate in the state where the second material compound adhered to the surface, a lithium composite oxide (cathode active material particles 22b) is generated.

4. EXAMPLES

Hereafter, specific examples (working examples) of the method for manufacturing the cathode active material particles 22b shown in FIG. 2 will be described.

4-1. Example 1

Tabular Particles

Hereafter, a specific example (Example 1) of a manufacturing method in case where the cathode active material particles 22b shown in FIG. 2 are shaped tabular will be explained.

Example 1-1

(1) Preparation of Slurry 81.6 parts by weight of $Ni(OH)_2$ powder (manufactured by Kojundo Chemical Co., Ltd.), 15.0 parts by weight of $Co(OH)_2$ powder (manufactured by Wako Pure Chemical Industries, Ltd.), and 3.4 parts by weight of $Al_2O_3-H_2O$ powder (manufactured by SASOL Ltd.) were weighed. Next, vehicle comprising 97.3 parts by weight of pure water and 0.4 parts by weight of a dispersing agent (manufactured by NOF CORPORATION, PN: AKM-0521), 0.2 parts by weight of 1-octanol (manufactured by KATAYAMA CHEMICAL, LTD.) as an antifoaming agent, and 2.0 parts by weight of binder (manufactured by JAPAN VAM & POVAL CO., LTD., PN: PV3) was prepared.

Then, slurry was prepared by mixing and grinding in wet such vehicle and raw powder (above-mentioned weighing thing). The wet mixing and grinding was performed by processing for 24 hours in a ball mill using zirconia balls with a diameter of 2 mm and thereafter processing for 40 minutes in a bead mill using a zirconia beads with a diameter of 0.1 mm.

(2) Granulation

Granulated objects were formed by supplying the above-mentioned slurry to a two-fluid nozzle type spray drier. It is possible to form the granulated objects in various sizes by suitably adjusting parameters, such as blow pressure of the spray drier, a diameter of the nozzle, and the amount of circulating winds.

(3) Heat Treatment (Calcination)

Cathode active material precursor particles which were particles of the composite oxide of nickel, cobalt, and aluminum (($Ni_{0.8}$, $Co_{0.15}$, $Al_{0.05}$)O) were obtained by heat-treating the above-mentioned granulated objects at 1100° C. for 3 hours (air atmosphere).

(4) Shaping

By weighing 100 parts by weight of the obtained cathode active material precursor particle powder, 50 parts by weight of carrier fluid (xylene:butanol=1:1), 10 parts by weight of polyvinyl butyral (manufactured by SEKISUI CHEMICAL CO., LTD., PN: BM-2) as a binder, 4.5 parts by weight of DOP (dioctyl phthalate: manufactured by KUROGANE KASEI Co., Ltd.) as a plasticizer, and 3 parts by weight of a dispersing agent (manufactured by Kao Corp., product name "RHEODOL SP-O30"), and preliminarily kneading them in a mortar, and thereafter kneading them using a Tri-roll kneader, a slurry for shaping with a viscosity of 2000 to 3000 cP was prepared (the viscosity was measured by using a Brookfield LVT type viscosity meter).

A sheet with a thickness of 40 micrometers square was formed by doctor blade method using the resultant slurry for shaping. A green sheet shaped object 1 mm square was obtained by punching the sheet after drying.

(5) Sintering (Introduction of Lithium)

By heat-treating the green sheet shaped object 1 mm square which was obtained as mentioned above at 900° C., the shaped object was degreased and calcinated. The temperature for calcination of the shaped object is lower than that for the above-mentioned heat treatment (calcination of the granulated object). This is for the purpose of making lithium spread and react uniformly at the time of the subsequent proper sintering (not calcination), by suppressing the proceeding of sintering between the particles inside the shaped object at the time of the calcination of the shaped object.

By feeding the resultant calcinated object into a rotary granulator with number of revolutions set at 15 rpm, spraying with an airbrush a predetermined quantity of dispersion liquid of lithium hydroxide monohydrate (LiOH—$H_2O$) in ethanol to the calcinated object in the rotary granulator, taking out the content of the granulator, and heat-treating the same at 750° C. for 6 hours (oxygen atmosphere), tabular particles of the cathode active material with a composition of Li($Ni_{0.8}$, $Co_{0.15}$, $Al_{0.05}$)$O_2$ (hereafter, referred to as a "cathode active material tabular object") were prepared. In addition, the above-mentioned ethanol dispersion LiOH—$H_2O$ was prepared as follows.

First, LiOH—$H_2O$ powder (manufactured by Wako Pure Chemical Industries, Ltd.) was ground by using a jet mill so that the particle diameter might be 1 to 5 micrometers by electron microscope observation. 1 part by weight of this powder was added to 100 parts by weight of ethanol (manufactured by KATAYAMA CHEMICAL, LTD) and then dispersed by ultrasonic wave until it became impossible for powder to be recognized by viewing.

Example 1-2

A cathode active material tabular object was prepared similarly to the above-mentioned Example 1-1, except that the number of revolutions of the rotary granulator was changed to 10 rpm, Example 1-3

A cathode active material tabular object was prepared similarly to the above-mentioned Example 1-1, except that the number of revolutions of the rotary granulator was changed to 5 rpm, Example 1-4

A cathode active material tabular object was prepared similarly to the above-mentioned Example 1-1, except that the number of revolutions of the rotary granulator was changed to 2 rpm, Example 1-5

A cathode active material tabular object was prepared similarly to the above-mentioned Example 1-1, except that the lithium source compound sprayed through the air brush was changed from lithium hydroxide monohydrate (LiOH—$H_2O$) to anhydrous lithium hydroxide (LiOH).

Comparative Example 1

A cathode active material powder was prepared similarly to the above-mentioned Example 2-1, except that the resultant calcinated object and powdery lithium hydroxide monohydrate (LiOH—$H_2O$) were mixed in a mortar instead of spraying lithium hydroxide monohydrate (LiOH—$H_2O$) dispersion to the resultant calcinated object.

4-2. Example 2

Powder (Non-Shaped Object)

Hereafter, a specific example (Example 2) of a manufacturing method in case where the cathode active material particles 22b shown in FIG. 2 are ordinarily powdery (not shaped tabular) will be explained.

Example 2-1

(1) Preparation of Slurry

Carried out similarly to the above-mentioned Example 1.

(2) Granulation

Carried out similarly to the above-mentioned Example 1.

(3) Heat Treatment (Calcination)

Carried out similarly to the above-mentioned Example 1.

(4) Sintering (Introduction of Lithium)

By feeding the resultant powder of the cathode active material particles into a rotary granulator with number of revolutions set at 15 rpm, spraying with an airbrush a predetermined quantity of dispersion liquid of lithium hydroxide monohydrate (LiOH—$H_2O$) in ethanol to the powder in the rotary granulator, taking out the content of the granulator, and heat-treating the same at 750° C. for 6 hours (oxygen atmosphere), the cathode active material powder with a composition of Li($Ni_{0.8}$, $Co_{0.05}$, $Al_{0.05}$)$O_2$ was prepared.

Example 2-2

A cathode active material powder was prepared similarly to the above-mentioned Example 2-1, except that the lithium source compound sprayed through the air brush was changed from lithium hydroxide monohydrate (LiOH—$H_2O$) to anhydrous lithium hydroxide (LiOH).

Comparative Example 2

A cathode active material powder was prepared similarly to the above-mentioned Example 2-1, except that the resultant calcinated powder and powdery lithium hydroxide monohydrate (LiOH—$H_2O$) were mixed in a mortar instead of spraying lithium hydroxide monohydrate (LiOH—$H_2O$) dispersion to the resultant calcinated powder.

4-3. Evaluation Method

The evaluation method of the cathode active materials manufactured by the methods for manufacturing the above-mentioned specific examples will be explained below.
(1) Coverage
Samples for SEM observation were prepared by embedding in synthetic resin the calcinated objects and the resultant calcinated powders (hereafter, collectively indicated to as "intermediates" for sake of simplicity) with lithium materials added thereto and thereafter grinding the same by CP polishing to reveal one cross section, and SEM observation was performed on these samples. Base on the observed images, for each intermediate, it was evaluated whether the lithium material adhered in the shape of film or in the shape of a granulated object.

Here, the "shape of film" was defined as to be s state where lithium material particles have adhered continuously on the surface of the intermediate with a thickness of two or more particles, and states other than that were defined as to be the "shape of a granulated object". Furthermore, the rate that the perimeter part of the intermediate in the cross section is covered with lithium materials was evaluated as a coverage (the coverage is 100% when the perimeter part of an intermediate is completely covered with lithium material).

(2) Half Width

As an index showing the quality of the synthesis degree of a cathode active material, the "half width" was evaluated. Herein, the "half width" refers to the half width of the (104) plane diffraction peak which appears around $2\theta=44.5°$ in the analysis result of XRD measurement of a cathode active material performed by a well-known method, (3) Split As an index showing the quality of the synthesis degree of a cathode active material, the value called a "split" is adopted as an evaluation method. Herein, the "split" refers to the value of the ratio I1/I2, wherein I1 is the diffraction intensity at the deepest valley between the (018) plane diffraction peak which appears around $2\theta=64.5°$ and the (110) plane diffraction peak which appears around $2\theta=65.1°$ in the analysis result of XRD measurement of a cathode active material performed by a well-known method, and I2 is the intensity of the (110) plane diffraction peak. The smaller the value of this split is, the higher the crystallinity is, i.e., the higher the synthesis degree is.

(4) Percent of Excellent Shape

For the tabular cathode active material, the shape was visually observed and evaluated the rate of the excellent shape without any crack in 100 tabular objects by percent. Here, a crack shall mean a break and a chip of a tabular object, and peeling (surface layer with a thickness equivalent to some crystal primary particles) at the surface, etc.

4-4. Evaluation Result

The evaluation result of the above-mentioned Example 1 (Example 1-1 to 1-5) and Comparative Example 1 is shown in Table 1, and the evaluation result of the above-mentioned Example 2 (Example 2-1 and 2-2) and Comparative Example 2 is shown in Table 2, respectively.

TABLE 1

| | Half Width | Split | Percent of Excellent Shape | Shape of Adhered Object | Coverage |
|---|---|---|---|---|---|
| Example 1-1 | 0.186 | 0.31 | 67 | Film | 98 |
| Example 1-2 | 0.186 | 0.32 | 70 | Film | 91 |
| Example 1-3 | 0.191 | 0.35 | 58 | Film | 74 |
| Example 1-4 | 0.198 | 0.39 | 52 | Film | 62 |
| Example 1-5 | 0.184 | 0.29 | 96 | Film | 99 |
| Comparative Example 1 | Unanalyzable | 0.89 | 69 | Granulated Object | 18 |

TABLE 2

| | Half Width | Split | Shape of Adhered Object | Coverage |
|---|---|---|---|---|
| Example 2-1 | 0.184 | 0.28 | Film | 98 |
| Example 2-2 | 0.181 | 0.27 | Film | 97 |
| Comparative Example 2 | 0.213 | 0.48 | Granulated Object | 32 |

As apparent from the results in Table 1, in Example 1-1 to 1-5 wherein the lithium source compound was coated in the shape of film, the synthesis degree better (higher) than Comparative Example 1 wherein the lithium source compound was in the shape of a granulated object was obtained by only dry blending of lithium source compound. In addition, in Example 1-5 wherein anhydrous lithium hydroxide was used, remarkably higher percent of excellent shape was obtained rather than Example 1-1-4 using a hydrate.

Furthermore, in the Example 1-1, 1-2, and 1-5, whose coverage is not less than 90%, much better synthesis degree was obtained. This is considered to be because the higher the coverage is, the more effectively the local shortage of lithium source compound is suppressed. Therefore, the coverage is preferably not less than 70%, more preferably not less than 90%.

Similarly, as apparent from the results in Table 2, in Example 2-1 to 1-2 wherein the lithium source compound was coated in the shape of film, the synthesis degree better than Comparative Example 2 wherein the lithium source compound was only dry blended was obtained.

Thus, the occurrence of local shortage of lithium source compound is suppressed as much as possible by uniformly coating of lithium source compound to an intermediate in the shape of film. This effect is especially well obtained when it is usually difficult to mix a lithium source compound uniformly in the particles before sintering (in case of powder with a large particle diameter, or when the particles are shaped in a predetermined shape).

5. EXEMPLIFICATION OF MODIFICATIONS

As mentioned above, the above-mentioned embodiments and examples are mere exemplification of the embodiments of the present invention which the applicant considered best when filing the present application, and the present invention should not be limited at all by the above-mentioned embodiments and examples. Therefore, it is a matter of course that various modifications may be given to the above-mentioned embodiments and examples as long as the substantial part of the present invention within is not changed.

Hereafter, some modifications will be exemplified. In the following explanation of modifications, the same name and the same mark shall be assigned for the components with the same composition or function in the modifications as those in the above-mentioned embodiments. Further, in the explanation of such components, the explanation in the above-mentioned embodiments shall be suitably applied in a consistent range.

Needless to say, even modifications are not limited to those described below. Limitingly construing the present invention based on the above-mentioned embodiment and the following modifications unfairly impairs the interests of an applicant (particularly, an applicant who is motivated to file as quickly as possible under the first-to-file system) while unfairly benefiting imitators, and is thus impermissible.

Needless to say, the configurations of the above-mentioned embodiments and the configuration s of the modifications to be described below are entirely or partially applicable in appropriate combination, so long as no technical inconsistencies are involved.

The configuration of the lithium secondary battery 1 which is a subject matter for application of the present invention is not limited to the above configurations. For example, the present invention is not limited to what is called liquid type battery configurations. That is, for example, as an electrolyte, gel electrolyte and polymer electrolyte may be used. Moreover, in the present invention, the composition of the cathode active material which can be used is not limited to the compositions shown in the above-mentioned examples.

The present invention is not limited to the above-mentioned specific manufacturing method at all. That is, for example, the granulated object obtained by granulating the hydroxide obtained by a coprecipitation method may be suitably used as a granulated object. Moreover, raw material powder may contain plural kinds of transition metal compounds (oxide, hydroxide, carbonate, etc.). Furthermore, the shaping method is not limited to the above-mentioned methods.

It is a matter of course that the modifications which are not particularly referred to are also encompassed in the technical scope of the present invention, so long as the invention is not modified in essence.

Moreover, the components which constitute means for solving the problems to be solved by the present invention and are illustrated with respect to operations and functions encompass not only the specific structures disclosed above in the above-mentioned embodiments and modifications but also any other structures that can implement the operations and functions. Further, the contents (including specifications and drawings) of the prior application and publications cited herein can be suitably incorporated hereinto to constitute a part of the present specification.

The invention claimed is:

1. A method for manufacturing a cathode active material containing a lithium composite oxide for a lithium secondary battery, comprising:
    an intermediate generation process, wherein an intermediate which is a powder or a shaped object containing a first material compound which is a compound of a transition metal other than lithium, which constitutes said lithium composite oxide, is generated,
    a lithium source compound addition process, wherein a second material compound which is a lithium compound is added so that the second material compound in the shape of a film adheres to a surface of said intermediate generated by said intermediate generation process, and
    a sintering process, wherein the lithium composite oxide is generated by sintering said intermediate in a state where said second material compound has adhered to said surface by said lithium source compound addition process,
    wherein said lithium source compound addition process is a process in which said second material compound is dispersed or dissolved in a solvent, and the solvent containing said second material compound is added to said intermediate.

2. The method for manufacturing a cathode active material for a lithium secondary battery according to claim 1, wherein a coverage, which is a value showing an amount of a portion that said second material compound has adhered to said surface of said intermediate, in said surface of said intermediate which passed through said lithium source compound addition process is not less than 70%.

3. The method for manufacturing a cathode active material for a lithium secondary battery according to claim 2, wherein said amount is not less than 90%.

4. The method for manufacturing a cathode active material for a lithium secondary battery according to claim 1, wherein said solvent containing said second material compound is sprayed on said surface of the intermediate.

5. The method for manufacturing a cathode active material for a lithium secondary battery according to claim 1,
    wherein anhydrous lithium hydroxide is used as said second material compound.

6. A method for manufacturing a cathode active material containing a lithium composite oxide for a lithium secondary battery, comprising:
    an intermediate generation process, wherein an intermediate which is a powder or a shaped object containing a first material compound which is a compound of a transition metal other than lithium, which constitutes said lithium composite oxide, is generated,
    a lithium source compound addition process, wherein a second material compound which is a lithium compound is added so that the second material compound in the shape of a film adheres to a surface of said intermediate generated by said intermediate generation process, and
    a sintering process, wherein the lithium composite oxide is generated by sintering said intermediate in a state where said second material compound has adhered to said surface by said lithium source compound addition process,
    wherein said intermediate generation process includes a shaping step, in which a forming material containing said first material compound is shaped in a predetermined form, and
    wherein said lithium source compound addition process is a process in which said second material compound is dispersed or dissolved in a solvent, and the solvent containing said second material compound is added to said intermediate.

7. A method for manufacturing a cathode active material containing a lithium composite oxide for a lithium secondary battery, comprising:
    an intermediate generation process, wherein an intermediate which is a powder or a shaped object containing a first material compound which is a compound of a transition metal other than lithium, which constitutes said lithium composite oxide, is generated,
    a lithium source compound addition process, wherein a second material compound which is a lithium compound is added so that the second material compound in the shape of a film adheres to a surface of said intermediate generated by said intermediate generation process, and
    a sintering process, wherein the lithium composite oxide is generated by sintering said intermediate in a state where said second material compound has adhered to said surface by said lithium source compound addition process,
    wherein said intermediate generation process includes a granulation process, wherein a granulated object of said first material compound is formed,
    wherein said intermediate generation process includes a shaping step, wherein said granulated objects are shaped in a predetermined form, and wherein said lithium source compound addition process is a process in which said second material compound is dispersed or dissolved in a solvent, and the solvent containing said second material compound is added to said intermediate.

8. The method for manufacturing a cathode active material for a lithium secondary battery according to claim 7, wherein said granulation process is a process of forming said granulated object by spray drying a slurry prepared by mixing the powder of a plurality of said first material compounds while wet grinding.

9. The method for manufacturing a cathode active material for a lithium secondary battery according to claim 7, wherein said intermediate generation process includes a calcination process, in which said granulated object is heat-treated.

* * * * *